(12) United States Patent
Blott et al.

(10) Patent No.: US 12,482,263 B2
(45) Date of Patent: Nov. 25, 2025

(54) METHOD FOR DETERMINING VIDEO SEGMENTS TO BE TRANSFERRED

(71) Applicant: Robert Bosch GmbH, Stuttgart (DE)

(72) Inventors: Gregor Blott, Salzgitter (DE); Jan Rexilius, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 60 days.

(21) Appl. No.: 17/931,660

(22) Filed: Sep. 13, 2022

(65) Prior Publication Data

US 2023/0090806 A1  Mar. 23, 2023

(30) Foreign Application Priority Data

Sep. 17, 2021 (DE) ..................... 10 2021 210 337.5

(51) Int. Cl.
*G06V 20/40* (2022.01)
*G06V 10/82* (2022.01)
*G06V 20/59* (2022.01)

(52) U.S. Cl.
CPC .............. *G06V 20/49* (2022.01); *G06V 10/82* (2022.01); *G06V 20/41* (2022.01); *G06V 20/59* (2022.01)

(58) Field of Classification Search
CPC ........ G06V 20/49; G06V 20/59; G06V 10/82; G06V 20/41
See application file for complete search history.

(56) References Cited

U.S. PATENT DOCUMENTS

| 2017/0263120 A1* | 9/2017 | Durie, Jr. | ............... G08G 1/205 |
| 2018/0025636 A1* | 1/2018 | Boykin | ............ G08G 1/096725 701/1 |
| 2019/0019036 A1* | 1/2019 | Yoo | ......................... G06V 10/82 |
| 2019/0294881 A1* | 9/2019 | Polak | .................... G06V 10/454 |
| 2020/0143182 A1* | 5/2020 | Noh | ....................... G06V 10/764 |
| 2020/0204848 A1* | 6/2020 | Johnson | .................. H04W 4/90 |
| 2021/0209381 A1* | 7/2021 | Boston | .................. B60W 30/08 |

FOREIGN PATENT DOCUMENTS

| CN | 109947989 A | * | 6/2019 | |
| CN | 112784102 A | * | 5/2021 | ............. G06F 16/73 |
| DE | 112013004591 T5 | | 6/2015 | |

OTHER PUBLICATIONS

Johnson et al., "DenseCap: Fully Convolutional Localization Networks for Dense Captioning," CVPR, 2016, pp. 4565-4574.

* cited by examiner

*Primary Examiner* — Rowina J Cattungal
(74) *Attorney, Agent, or Firm* — NORTON ROSE FULBRIGHT US LLP

(57) ABSTRACT

A method for determining video segments to be transferred of a video, which is recorded in a vehicle using a camera. The method including, for one or for each of multiple video segments of the videos recorded in the vehicle, analyzing the one or one of each of the multiple video segments with respect to its respective content, generating data, which include pieces of information relating to the respective content of a respective video segment, conveying the data to an extra-vehicular processing system, receiving pieces of information about one or about multiple video segments to be transferred from the extra-vehicular processing system and transferring the one or the multiple video segments to be transferred to the extra-vehicular processing system. A method carried out in the processing system, a camera system, and a processing system are also described.

16 Claims, 2 Drawing Sheets

300

METHOD FOR DETERMINING VIDEO SEGMENTS TO BE TRANSFERRED

FIELD

The present invention relates to a method for determining video segments to be transferred of a video, which is recorded in a vehicle with the aid of a camera, as well as to a processing system, to a camera system and to a computer program for carrying out the method.

BACKGROUND INFORMATION

Cameras, in particular, interior cameras and/or exterior cameras may be provided in vehicles, which record videos of the passenger compartment or of the surroundings of the vehicle. The videos may, for example, be evaluated by driver assistance systems, which are able to retrieve resultant pieces of information that may assist the driver in the task of driving the vehicle. In the case of so-called dashcams, it may also be provided that recorded videos are stored.

SUMMARY

According to the present invention, a method is provided for determining video segments to be transferred of a video, which is recorded in a vehicle with the aid of a camera, as well as a processing system, a camera system, and a computer program for carrying out the method, are provided. Advantageous embodiments are the present invention are disclosed herein.

The present invention is concerned with cameras, which are provided in vehicles in order to capture or record videos of the passenger compartment and/or of the exterior, i.e., of the surroundings of the vehicle. In the case of so-called dashcams as cameras, in particular, these videos may also be stored at least for a certain period of time in the camera or in a processing system (including a memory) connected thereto. A content analysis is also possible in the case of such videos, for example, of the passenger compartment of vehicles, in order to make safe drives possible, or of the surroundings in order to provide proof videos in the case of accidents.

One possibility of the typically existing connection of vehicles to extra-vehicular processing systems (for example, the so-called cloud) via wireless communication systems such as, for example, mobile radio connections, is to transfer the videos recorded by such cameras to such extra-vehicular processing systems. This permits, for example, a more-in-depth analysis or evaluation of the videos than in the vehicle itself.

However, in spite of wireless communication systems having increasingly higher data transfer rates, the large volume of data required to be transferred in such videos, for example, during longer distance driving of the vehicle, is a problem. To the extent possible, this volume should be kept to a minimum, for example, in order to exhaust as little as possible an existing data volume and, for example, to also reserve it for other services. Against this background, a possibility is provided within the scope of the present invention for significantly reducing at least in most cases the volume of data to be transferred, but to still be able to continue to transfer videos or segments thereof to be transferred to the extra-vehicular processing system. For this purpose, steps necessary in the vehicle or in a processing system therein such as, for example, in a control unit or in a processing unit contained in a camera system on the one hand, but on the other hand also in the extra-vehicular processing system, are carried out. The present invention in this case relates to the methods carried out in the vehicle and in the extra-vehicular processing system, both individually as well as together. These will, however, be described together in the following.

In general, a video is recorded with the aid of the camera in the vehicle. According to an example embodiment of the present invention, this video is then divided, for example, into multiple video segments, i.e., video segments may, for example, be generated having a particular length such as, for example, 30 seconds or 1 minute. In a borderline case, a video segment could, however, also be only one single image or one frame. Each of these video segments is then analyzed with regard to its respective content. This analysis may, for example, also take place online or in real time or virtually in real time. For this purpose, a video segment may be generated (i.e., the corresponding portion of the video may simply be used) once the instantaneously recorded video has reached a length necessary for a video segment. This may then take place in succession for one video segment each. Equally, however, an already existing longer video may also be divided into multiple video segments, which are then correspondingly analyzed in succession or also, if possible, in parallel.

The analysis of a video segment with respect to its content is understood in this case, in particular, to mean that it is analyzed in terms of what the video segment shows, i.e., for example, whether a person may be seen on the segment and what specifically this person is doing, for example, has the hands on the steering wheel, is looking in the rearview mirror and the like. For the processing of the video segments, i.e., the image or video data, it is possible, for example, to use so-called "image captioning" methods as described, for example, in J. Johnson, A. Karpathy, Fei-Fei Li, "DenseCap: Fully Convolutional Localization Networks for Dense Captioning," CVPR, 2016. Data are then further generated, which include pieces of information relating to the respective content of a respective video segment. These pieces of information may include, in particular, one or multiple words in text format, which describe the respective content of a respective video segment. This involves then a type of automatic image or video description or image or video annotation.

During the processing or analysis, a feature vector may be created, for example, from a video segment or image/video initially using an artificial neural network or another machine learning method. This may include, for, example, linking different pieces of information present in the video segment (such as, for example, geometric shapes that suggest particular contents) by comparison (with known shapes) with particular values or numbers. The results obtained thereby (feature vector) may then be forwarded, for example to a so-called recurrent neural network (for example, an LSTM network, i.e., a "Long Short-Term Memory" network), with which the data or the description are created. Here, too, it may be determined, for example, by comparison with known feature vectors, which description is to be selected.

Thus, a (semantic) description is thereby generated, in particular, from a video segment, for example, in the form of "child is seated with a ball in a green vehicle, the driver is distracted" or "person is seated in the vehicle and steering." The volume of data of such a description, i.e., the mentioned data, is thus significantly less than the volume of data of the underlying video segment. Thus, a type of data compression is carried out.

The data generated thereby are then conveyed from the vehicle (for example, via a wireless communication link) to the extra-vehicular processing system. In the extra-vehicular processing system, these data are then analyzed in terms of whether the one or at least one of the multiple video segments (for which these data include the pieces of information or description) is to be classified as to be transferred. A classification as to be transferred takes place in this case, in particular, when the relevant video segment or the pieces of information contained therein is/are deemed to be important or of interest for a particular purpose. Thus, for example, in the case of a video of the surroundings, an accident visible on the video may be deemed important, all video segments that show the accident are then classified as to be transferred. In the case of a video of the passenger compartment, this may be a situation, for example, in which for a longer period of time the driver is not looking in the driving direction or is otherwise distracted.

The analysis of the data in terms of whether the one or at least one of the multiple video segments is to be classified as to be transferred, may take place, for example, by a person, a so-called operator, who views the data on the extra-vehicular processing system, for example, of a center, in which such data are generally collected and evaluated. Here, it is particularly advantageous if the data include one or multiple words in text format, since this allows a person to determine or to select video segments to be transferred in a particularly rapid manner.

Equally, however, it is also particularly preferred if the analysis of the data in terms of whether the one or at least one of the multiple video segments is classified as to be transferred, takes place in the extra-vehicular processing system in an automated manner, in particular, using a machine learning method, in particular, an artificial neural network, or also another suitable algorithm. This may take place faster than, for example, by a person. In this case, an analysis of the data may then take place, for example, if they include words, by particular, with respect to being transferable terms, so-called keywords. These may, for example, be predefined depending on the preference and the situation, for example, in the form of a list, the words in the data may then be compared with the words in the list in an automated manner.

In the automated analysis of the data, in particular, it is possible, however, instead of the words in text format to also use other pieces of information. It is possible, for example, to use particular reference numbers for particular situations to be transferred. In this case, it is crucial, in particular, that the data or the pieces of information contained therein allow a conclusion to be drawn about situations in the video to be potentially transferred, the volume of data, however, thereby being (significantly) less than in the video segments themselves.

If, in this case, the one or at least one of the multiple video segments is classified as to be transferred, pieces of information about the one or the at least one of the multiple video segments to be transferred are conveyed from the extra-vehicular processing system to the vehicle. In other words, the relevant video segments are requested. For this purpose, the data that include pieces of information relating to the respective content of a respective video segment may advantageously also include an identifier of the video segment, and this identifier is then conveyed as pieces of information about one or multiple video segments to be transferred.

Thereafter, the one or the at least one of the multiple video segments to be transferred is conveyed from the vehicle to the extra-vehicular processing system. Thus, one or multiple video segments including a relatively high volume of data is/are transferred via the wireless communication link only if these video segments (so-called "chunks") also include a transferable content, even then only the segments or parts to be transferred are transferred, not however, parts of the video not to be transferred.

In the following, it will be explained based on a short example, which volume of data to be transferred may be saved in the process. A data rate of the video of, for example, 1.2 Mbit/s results in a volume of data of 2,160 Mbit or 270 MB for a video over a drive of, for example, 30 minutes. If, for example, video segments of a length of 1 minute are now formed from the video and, for example, (only) one such video segment is classified as to be transferred, only 72 Mbit or 9 MB are required to be transferred for this drive. Added to this then are the data that include the pieces of information relating to content. In the case of a pure text description, this would be, for example, at 50 characters per video segment, 1,500 characters for this drive. At 8 bits per character (ASCII), this results in 12,000 bit i.e., 0.012 Mbit or 0.0015 MB per drive. In the event that ultimately no video segment at all must be transferred (which will generally be the case), this corresponds to a savings by the factor 6,000 in the amount of data to be transferred. Even if one or also multiple video segments are to be transferred, a significant savings is still achieved. Only in exceptional cases, for example, must the entire video be transferred for an evaluation.

According to an example embodiment of the present invention, it is further preferred if the analysis of the video segments and the generation of the data is trained beforehand with pieces of information about the content, in particular if a neural network is used for this analysis and the generation. This may take place in advance based on training data with given data, for example, text descriptions. Here, it is possible to use, for example, already in a targeted manner, data for the application provided here in order to achieve a good performance. The training per se may take place as is customary for neural networks by using known contents of video segments with associated descriptions in order to adapt the weights (neurons) in the neural network.

Moreover, it is also possible in such a way, for example, to train the automated analysis of the data in terms of whether a video segment is classified as to be transferred, for example, with respect to particular situations. In this case, it is also possible that individual video segments are specifically requested from vehicles, which may then be used for the training.

A processing system according to the present invention, for example, a control unit of a motor vehicle, a processing unit of a camera system or a central server, is, in particular, programmed to carry out a method according to the present invention.

According to an example embodiment of the present invention, the implementation of a method according to the present invention in the form of a computer program or computer program product including program code for carrying out all method steps is also advantageous, since this results in particularly low costs, in particular, if an executing control unit is also utilized for further tasks and is therefore already present. Finally, a machine-readable memory medium is provided including a computer program stored thereon as described above. Suitable memory media or data carriers for providing the computer program are, in particular, magnetic, optical and electrical memories such as, for example, hard disks, flash memories, EEPROMs, DVDs and the like. A download of a program via computer networks (Internet, Intranet, etc.) is also possible. Such a download in this case may take place in a hardwired or cable-bound or wireless (for example, via a WLAN network, a 3G-, 4G-, 5G- or 6G-connection, etc.) manner.

Further advantages and embodiments of the present invention result from the description and from the figures.

The present invention is schematically represented in the figures based on an exemplary embodiment and is described below with reference to the figures.

DETAILED DESCRIPTION OF EXAMPLE EMBODIMENTS

Figure 1:
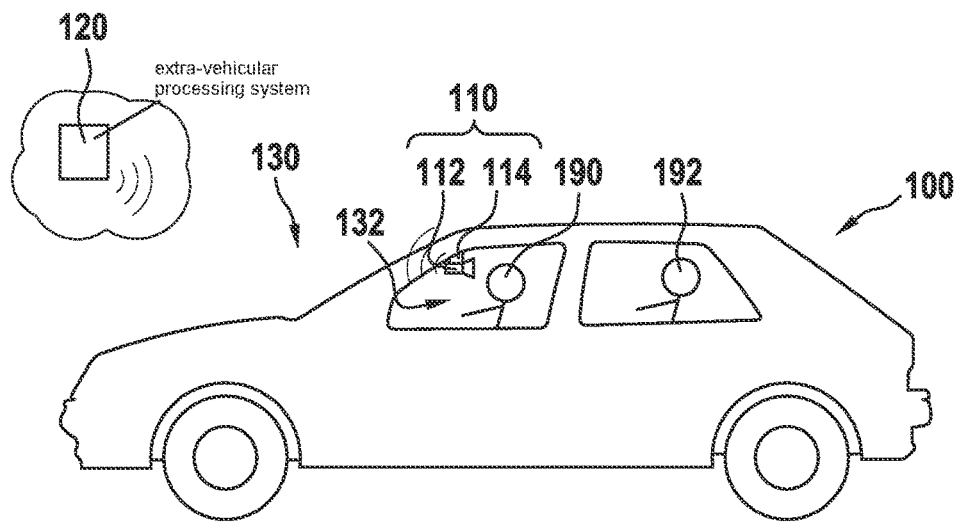
FIG. 1 schematically shows a vehicle including a camera system, with which a method according to the present invention is implementable.

A vehicle 100 including a camera system 110 is schematically represented in FIG. 1, with which a method according to the present invention is implementable. Camera system 110 includes a camera 112 as well as a processing system or a processing unit 114. Camera 112 is, for example, a so-called dashcam and may record a passenger compartment 132 of vehicle 100 and thus, in particular, persons situated therein, such as a driver 190 or a person 192 on a rear bench seat. A video may, in particular, be recorded or captured with the aid of camera 112.

With the aid of processing system 114, it is possible to analyze and process such a video, as is explained in greater detail below. Computer system 114 is, in particular, also equipped with or connected to a radio module for wireless communication, so that data may be exchanged via a wireless communication link with an extra-vehicular processing system 120, for example, with a server in a computer center. Processing system 114 could, however, also be connected to a (different) radio module in the vehicle.

It would also be possible that instead of passenger compartment 132, camera 112 is also able to record surroundings 130 of vehicle 100, in particular an area ahead of the vehicle (to the left of the vehicle in the figure). Depending on the recording angle of the camera, both the passenger compartment and the surroundings could be recorded. The present invention may, however, be applied to all cases, likewise, it may also be applied to a camera for the passenger compartment as well as to a camera for the surroundings.

Figure 2:
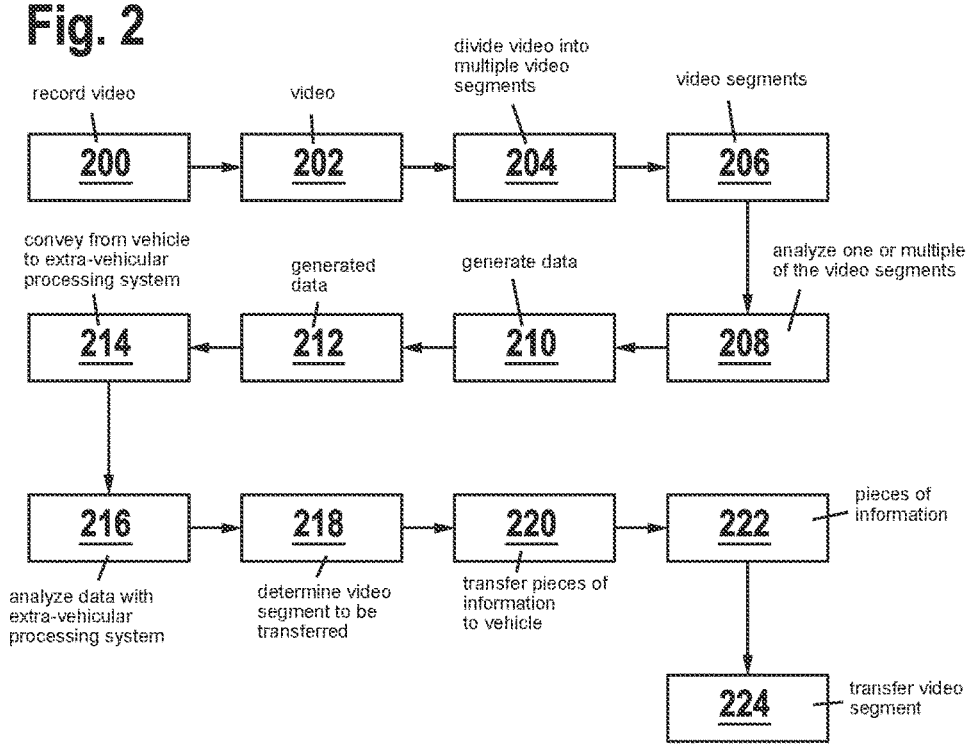
FIG. 2 schematically shows a sequence of a method according to the present invention in one preferred specific example embodiment.

A sequence of a method according to the present invention is schematically represented in a preferred specific embodiment in FIG. 2. In a step 200, a video 202 of the passenger compartment of the vehicle is recorded with the aid of the camera, as it is shown, for example, in FIG. 1. The video in this case may be recorded or captured in a suitable resolution and with a suitable framerate. Although typical cameras have, for example, a framerate of 30 images or frames per second, the present invention is also applicable at higher and lower framerates. A very low framerate of, for example, only one image or frame per second is also possible. Although generally no longer referred to as a video here, this is nevertheless to be referred to as a video within the scope of the present invention, particularly since the present invention is likewise applicable here.

In a step 204, video 202 is then divided into multiple video segments 206. This may take place, for example, by initially storing or buffering the video, then subsequently gradually generating segments of the video of a particular length. In principle, however, it is also possible to also use, for example, in virtual real time, in each case the last recorded segment of the video of the particular length in each case as an instantaneous video segment.

In a step 208, the one or the multiple video segments are then analyzed with regard to their respective content. In the process, it is determined, in particular, what may be seen or recognized in a relevant video segment, i.e., for example, which situation is taking place, which persons are located in the passenger compartment of the vehicle and what specifically they are doing, i.e., in the video segment.

Figure 3:
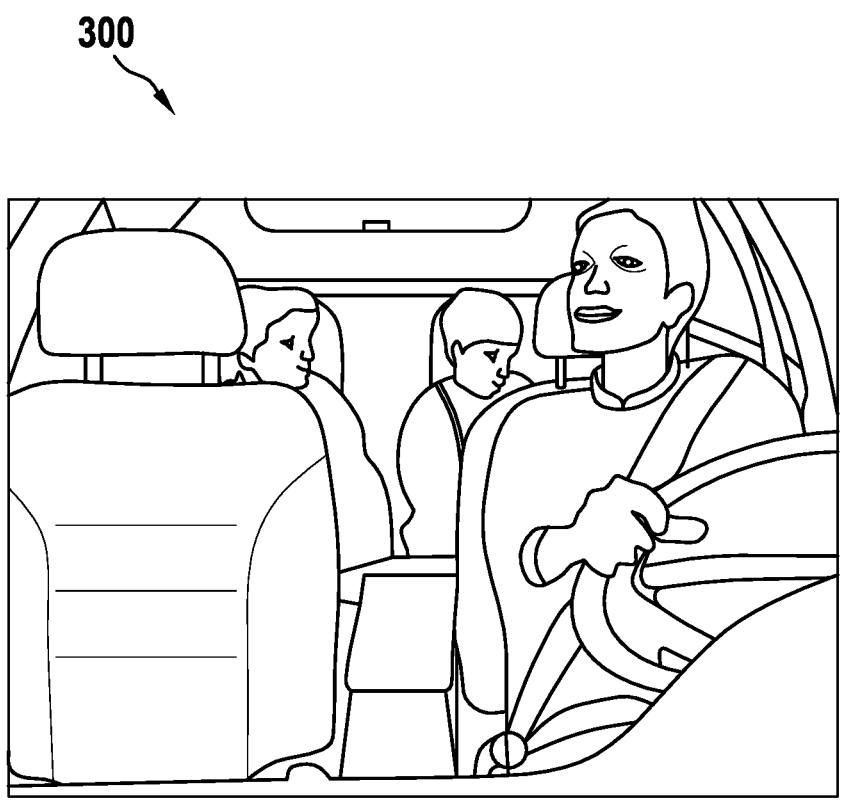
FIG. 3 schematically shows a video segment, as it may appear in one preferred specific example embodiment in a method according to the present invention.

For this purpose, such a video segment 300 is shown by way of example in FIG. 3. For the purpose of illustration, this is an image or a single frame of a video or video segment. As mentioned, such a single image may, however, in principle also be considered to be a video segment. The passenger compartment of a vehicle may be seen on video segment 300, one person seated on the driver's seat and looking into the rearview mirror, in addition, this person has their right hand on the steering wheel. Two children are seated on the rear bench seat.

In a step 210, data 212 are then generated for each analyzed video segment, which include pieces of information relating to the content and, preferably also relating to the identification of the video segment (identifier). As mentioned, such pieces of information may include, in particular, a description including words in text format. In the example of video segment 300 in FIG. 3, such a description could read, for example, as follows: "Driver looking in rearview mirror; two children on the rear bench seat." This may take place, as already mentioned, for example, with the aid of so-called "image captioning" methods.

In a step 214, these data are then conveyed from the vehicle or, for example, with the aid of processing system 114 there, as shown in FIG. 1, to an extra-vehicular processing system such as, for example, processing system 120 in FIG. 1, and received there. This may take place, for example, successively for each analyzed video segment, or else also compiled for multiple analyzed video segments.

In a step 216, these data 212 are analyzed in the extra-vehicular processing system in terms of whether at least one of the video segments is to be classified as to be transferred. For this purpose, the words contained in the data may, for example, be compared with a list that includes words or terms, in which a video segment is to be classified as to be transferred. This may include, for example, terms such as "driver," "bottle," "cell phone," "side window," or also content descriptions such as "driver is looking out the side window." In this example, it may be obvious, for example, that the person is not concentrating on the road traffic. In video segments of a certain length, it may also be considered (in the pieces of information in the data) whether this situation has occurred for a longer period of time. If the person has looked only briefly out the side window, but thereafter in the driving direction again, then no problem may be assumed.

If at least one video segment is to be classified as to be transferred, then in step 218, this video segment is then determined as to be transferred. In step 220, pieces of information 222 about the at least one video segment to be transferred, in particular, its identifier, are then conveyed from the extra-vehicular processing system to the vehicle and received there. This may be designed in the form of a query, with which a sending of the relevant video segment is queried or requested.

In step 224, the at least one (queried) video segment to be transferred is then transferred or sent from the vehicle to the extra-vehicular processing system and received there. There, the video segment may then be further processed depending on preference and need.

What is claimed is:

1. A method for determining video segments, which are to be transferred, of a video, which is recorded in a vehicle using a camera in the vehicle, the method comprising:

analyzing, in the vehicle, multiple video segments of the video recorded in the vehicle with respect to a respective content of each of the video segments, and generating for each of the video segments, based on the analyzing, data relating to the respective content of the video segment, the data for each of the video segments including a semantic description of the respective content of the video segment and a respective identifier of the video segment;

conveying, from the vehicle, only the data generated for the video segments and not the video segments themselves to an extra-vehicular processing system;

receiving, by the vehicle from the extra-vehicular processing system in response to the conveyed data, information indicating which one or more of the video segments is to be transferred from the vehicle to the extra-vehicular processing system, the information including the respective identifier of each of the one or more of the video segments to be transferred; and in response to receiving, from the extra-vehicular processing system, the information indicating which one or more of the video segments is to be transferred including the respective identifier of each of the one or more of the video segments to be transferred, transferring, from the vehicle, only the indicated one or more of the video segments and not others of the video segments, to the extra-vehicular processing system, wherein the vehicle transfers the indicated one or more of the video segments and not others of the video segments to the extra-vehicular processing system only after receiving, from the extra-vehicular processing system, the information indicating which one or more of the video segments is to be transferred;

wherein the analyzing of the multiple video segments includes analysis, using an artificial neural network in the vehicle, of what each of the video segments shows, and creating, for each of the video segments, using the artificial neural network, at least one feature vector by linking different pieces of information present in the video segment, and wherein the at least one feature vector of each of the video segments is forwarded to a Long Short-Term Memory (LSTM) network in the vehicle, with which the semantic description of the respective content of each of the video segments is created or selected, so that a volume of data of the semantic description is less than a volume of data of the video segment, so as to provide data compression;

wherein the video which is recorded in the vehicle using the camera, includes (i) a video of a passenger compartment of the vehicle, or (ii) a video of surroundings of the vehicle.

2. The method as recited in claim 1, wherein the video, which is recorded in the vehicle using the camera, includes the video of the passenger compartment of the vehicle.

3. The method as recited in claim 2, wherein the video is of an area in which a driver of the vehicle is seated.

4. The method as recited in claim 1, wherein the video, which is recorded in the vehicle using the camera, includes the video of the surroundings of the vehicle.

5. The method as recited in claim 1, wherein the linking of the different pieces of information present in the video segment includes linking geometric shapes in the video segment by comparison with known shapes, so as to indicate a particular content.

6. The method as recited in claim 1, wherein the semantic description of the respective content of each of the video segments is created or selected, including by comparison of the forwarded at least one feature vector with known feature vectors having semantic descriptions of which at least one of the semantic descriptions is selected as the semantic description of the respective content of the video segment.

7. The method as recited in claim 1, wherein the extra-vehicular processing system determines which of one or more of the video segments is to be transferred from the vehicle to the extra-vehicular processing system based on the semantic descriptions of the respective content of the video segments.

8. A method for determining video segments, which are to be transferred, of a video, which have been recorded in a vehicle using a camera in the vehicle, the method comprising:

receiving, by an extra-vehicular processing system via a wireless communication link, data which include a description of content of each of multiple video segments of the video recorded in the vehicle and a respective identifier of each of the video segments, but not the video segments themselves, from the vehicle, the description of the content of each of the multiple video segments being a semantic description of the content of the video segment;

analyzing, in an automated manner, by the extra-vehicular processing system, the data of each of the video segments including the semantic description of the content of the video segment, in terms of whether the video segment is to be classified as to be transferred;

determining which one or more of the video segments is to be transferred based on the analyzing;

based on the determining which one or more of the video segments is to be transferred, conveying to the vehicle pieces of information about the one or more of the video segments indicating that the one or more of the video segments is to be transferred, the pieces of information including the respective identifier of each of the one or more video segments;

receiving the one or more of the video segments from the vehicle, the vehicle transferring only the one or more of the video segments and not others of the video segments in response to receiving the conveyed pieces of information from the extra-vehicular processing system, the vehicle transferring the one or more of the video segments to the extra-vehicular processing system only after receiving the conveyed pieces of information from the extra-vehicular processing system indicating that the one or more of the video segments is to be transferred;

wherein the video which is recorded in the vehicle using the camera, includes (i) a video of a passenger compartment of the vehicle, or (ii) a video of surroundings of the vehicle.

9. A processing apparatus configured to determine video segments, which are to be transferred, of a video, which is recorded in a vehicle using a camera in the vehicle, comprising:
a processing system configured to perform the following:
analyzing, in the vehicle, multiple video segments of the video recorded in the vehicle with respect to a respective content of each of the video segments, and generating for each of the video segments, based on the analyzing, data relating to the respective content of the video segment, the data for each of the video segments including a semantic description of the respective content of the video segment and a respective identifier of the video segment;
conveying, from the vehicle, only the data generated for the video segments and not the video segments themselves to an extra-vehicular processing system;
receiving, by the vehicle from the extra-vehicular processing system in response to the conveyed data, information indicating which one or more of the video segments is to be transferred from the vehicle to the extra-vehicular processing system, the information including the respective identifier of each of the more or more of the video segments to be transferred; and
in response to receiving, from the extra-vehicular processing system, the information indicating which one or more of the video segments is to be transferred including the respective identifier of each of the one or more of the video segments to be transferred, transferring, from the vehicle, only the indicated one or more of the video segments and not others of the video segments, to the extra-vehicular processing system, wherein the vehicle transfers the indicated one or more of the video segments and not others of the video segments to the extra-vehicular processing system only after receiving, from the extra-vehicular processing system, the information indicating which one or more video segments is to be transferred;
wherein the analyzing of the multiple video segments includes analysis, using an artificial neural network in the vehicle, of what each of the video segments shows, and creating, for each of the video segments, using the artificial neural network, at least one feature vector by linking different pieces of information present in the video segment, and
wherein the at least one feature vector of each of the video segments is forwarded to a Long Short-Term Memory (LSTM) network in the vehicle, with which the semantic description of the respective content of each of the video segments is created or selected, so that a volume of data of the semantic description is less than a volume of data of the video segment, so as to provide data compression;
wherein the video which is recorded in the vehicle using the camera, includes (i) a video of a passenger compartment of the vehicle, or (ii) a video of surroundings of the vehicle.

10. The processing apparatus as recited in claim 9, wherein the extra-vehicular processing system determines which of one or more of the video segments is to be transferred from the vehicle to the extra-vehicular processing system based on the semantic descriptions of the respective content of the video segments.

11. A camera system, which is attachable or attached to a vehicle, comprising:
a camera in the vehicle; and
a processing system configured to determine video segments, which are to be transferred, of a video, which is recorded in the vehicle using the camera, wherein the processing system is configured to perform the following:
analyzing, in the vehicle, multiple video segments of the video recorded in the vehicle with respect to a respective content of each of the video segments, and generating for each of the video segments, based on the analyzing, data relating to the respective content of the video segment, the data for each of the video segments including a semantic description of the respective content of the video segment and a respective identifier of the video segment;
conveying, from the vehicle, only the data generated for the video segments and not the video segments themselves to an extra-vehicular processing system;
receiving, by the vehicle from the extra-vehicular processing system in response to the conveyed data, information indicating which one or more of the video segments is to be transferred from the vehicle to the extra-vehicular processing system, the information including the respective identifier of each of the one or more of the video segments to be transferred; and
in response to receiving, from the extra-vehicular processing system, the information indicating which one or more of the video segments is to be transferred including the respective identifier of each of the one or more video segments to be transferred, transferring, from the vehicle, only the indicated one or more of the video segments and not others of the video segments, to the extra-vehicular processing system, wherein the vehicle transfers the indicated one or more of the video segments and not others of the video segments to the extra-vehicular processing system only after receiving, from the extra-vehicular processing system, the information indicating which one or more of the video segments is to be transferred;
wherein the analyzing of the multiple video segments includes analysis, using an artificial neural network in the vehicle, of what each of the video segments shows, and creating, using the artificial neural network, at least one feature vector by linking different pieces of information present in the video segment, and
wherein the at least one feature vector of each of the video segments is forwarded to a Long Short-Term Memory (LSTM) network in the vehicle, with which the semantic description of the respective content of each of the video segments is created or selected, so that a volume of data of the semantic description is less than a volume of data of the video segment, so as to provide data compression;
wherein the video which is recorded in the vehicle using the camera, includes (i) a video of a passenger compartment of the vehicle, or (ii) a video of surroundings of the vehicle.

12. The camera system as recited in claim 11, wherein the extra-vehicular processing system determines which of one or more of the video segments is to be transferred from the vehicle to the extra-vehicular processing system based on the semantic descriptions of the respective content of the video segments.

13. A non-transitory machine-readable medium, on which is stored a computer program, which is executable by a processor, comprising:
- a program code arrangement having program code for determining video segments, which are to be transferred, of a video, which is recorded in a vehicle using a camera in the vehicle, by performing the following:
    - analyzing, in the vehicle, multiple video segments of the video recorded in the vehicle with respect to a respective content of each of the video segments, and generating for each of the video segments, based on the analyzing, data relating to the respective content of the video segment, the data including a semantic description of the respective content of the video segment and a respective identifier of the segment;
    - conveying, from the vehicle, only the data generated for the video segments and not the video segments themselves to an extra-vehicular processing system;
    - receiving, by the vehicle from the extra-vehicular processing system in response to the conveyed data, information indicating which of one or more of the video segments is to be transferred from the vehicle to the extra-vehicular processing system, the information including the respective identifier of each of the one or more of the video segments to be transferred; and
    - in response to receiving, from the extra-vehicular processing system, the information indicating which one or more of the video segments is to be transferred including the respective identifier of each of the one or more of the video segments to be transferred, transferring, from the vehicle, only the indicated one or more video segments to be transferred and not others of the video segments, to the extra-vehicular processing system, wherein the vehicle transfers the indicated one or more video segments and not the others of the video segments to the extra-vehicular processing system only after receiving, from the extra-vehicular processing system, the information indicating which one or more of the video segments is to be transferred;
- wherein the analyzing of the multiple video segments includes analysis, using an artificial neural network in the vehicle, of what each of the video segments shows, and creating, using the artificial neural network, at least one feature vector by linking different pieces of information present in the video segment, and
- wherein the at least one feature vector of each of the video segments is forwarded to a Long Short-Term Memory (LSTM) network in the vehicle, with which the semantic description of the respective content of each of the video segments is created or selected, so that a volume of data of the semantic description is less than a volume of data of the video segment, so as to provide data compression;
- wherein the video which is recorded in the vehicle using the camera, includes (i) a video of a passenger compartment of the vehicle, or (ii) a video of surroundings of the vehicle.

14. The non-transitory machine-readable medium as recited in claim 13, wherein the linking of the different pieces of information present in the video segment includes linking geometric shapes in the video segments by comparison with known shapes, so as to indicate a particular content.

15. The non-transitory machine-readable medium as recited in claim 13, wherein the semantic description of the respective content of each of the video segments is created or selected, including by comparison of the forwarded at least one feature vector with known feature vectors having semantic descriptions of which at least one of the semantic descriptions is selected as the semantic description of the respective content of the video segment.

16. The non-transitory machine-readable medium as recited in claim 13, wherein the extra-vehicular processing system determines which of one or more of the video segments is to be transferred from the vehicle to the extra-vehicular processing system based on the semantic descriptions of the respective content of the video segments.

* * * * *